United States Patent [19]
Sefidvash

[11] Patent Number: 6,131,176
[45] Date of Patent: Oct. 10, 2000

[54] ON-THE-FLY DATA INTEGRITY TRANSFER SYSTEM HANDLING MIXED BLOCK SIZES

[75] Inventor: Khorvash Sefidvash, Laguna Niguel, Calif.

[73] Assignee: Unisys Corporation, Blue Bell, Pa.

[21] Appl. No.: 08/255,518

[22] Filed: Jun. 7, 1994

[51] Int. Cl.[7] .......................... H03M 13/00; G06F 11/00
[52] U.S. Cl. ........................... 714/758; 714/48; 714/800; 714/804; 714/819; 340/825.16
[58] Field of Search .................. 371/40.1, 50.1, 371/51.1, 67.1, 37.7; 340/825.34, 825.16, 825.17; 370/85.1; 714/758, 800–805, 48–52, 819

[56] References Cited

U.S. PATENT DOCUMENTS

| | | | |
|---|---|---|---|
| 4,789,986 | 12/1988 | Koizumi | 371/67.1 X |
| 4,864,531 | 9/1989 | Quatse | 371/67.1 X |
| 4,866,666 | 9/1989 | Francisco | 371/67.1 X |
| 5,182,752 | 1/1993 | DeRoo et al. | 371/37.7 |
| 5,243,607 | 9/1993 | Tsang et al. | 371/40.1 |
| 5,285,456 | 2/1994 | Cheney et al. | 371/51.1 X |
| 5,313,627 | 5/1994 | Amini et al. | 371/49.1 X |
| 5,319,752 | 6/1994 | Petersen et al. | 395/250 |

*Primary Examiner*—Emmanuel L. Moise
*Attorney, Agent, or Firm*—Alfred W. Kozak; Mark T. Starr; Rocco L. Adornato

[57] ABSTRACT

An on-the-fly integrity checking system which duplicates data passing through a main systems bus, functions concurrently to recognize the size of data blocks being transferred from a sending module to a receiving module. Each word transferred is immediately parity checked. A counter indicates when the entire data block has transferred so as to initiate the comparison of an original block EDC signature with that of a internally generated EDC value to indicate the validity or invalidity of the data transfer. No delay is involved on the data transfer operations of the main system bus due to the integrity checking system operating independently as an independent module which does not delay data transfers on the main system bus.

4 Claims, 4 Drawing Sheets

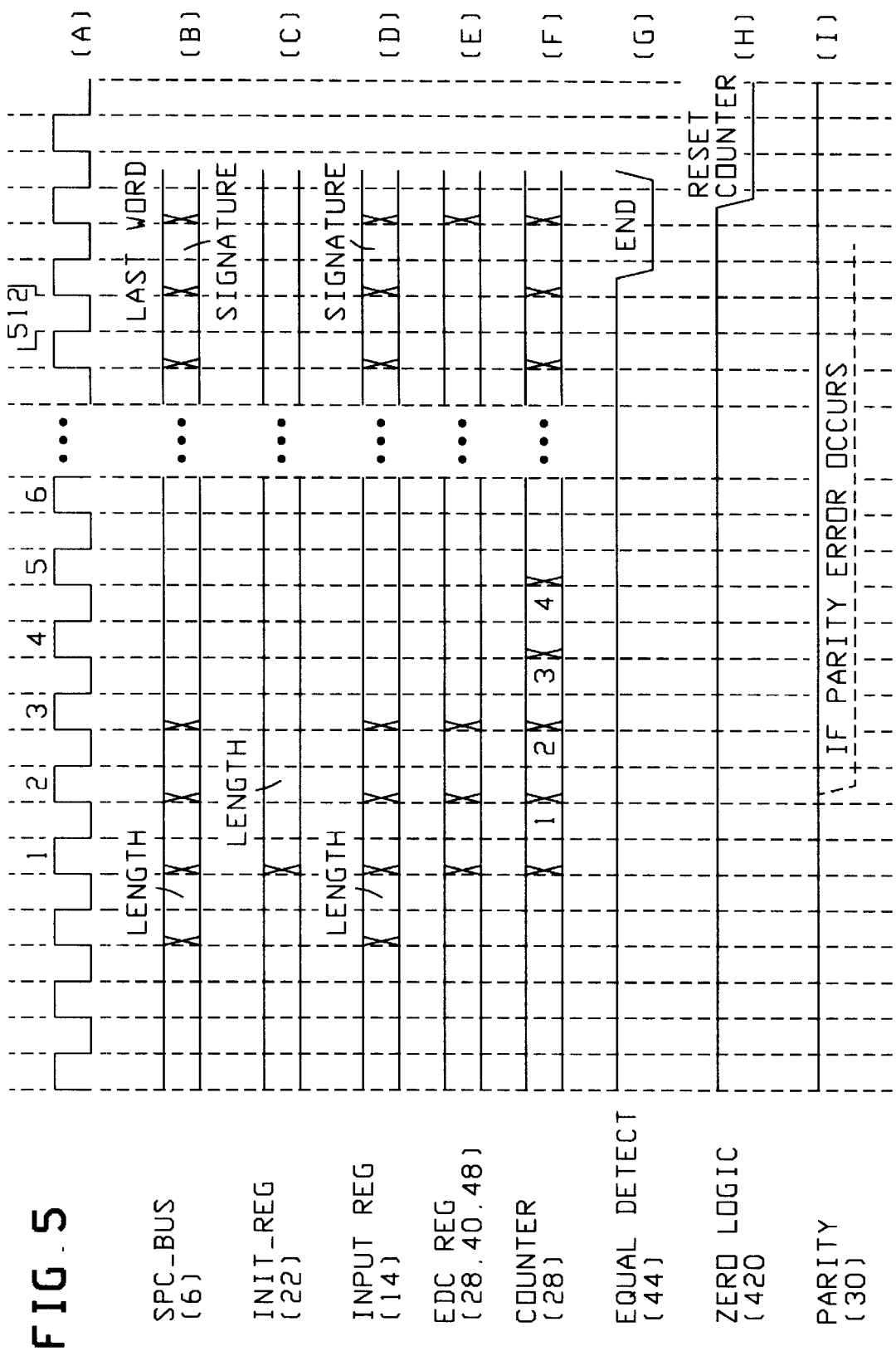

ON-THE-FLY DATA INTEGRITY TRANSFER SYSTEM HANDLING MIXED BLOCK SIZES

BACKGROUND OF THE INVENTION

One of the basic operational functions of a digital computer or a digital module data transfer system has to do with the integrity or reliability of the data being transferred. To this end, digital systems have generally been provided with one type or another of means for error checking or data parity checking in order to insure that data being transferred has not been corrupted.

As seen in FIG. 2, there is a block diagram of a data transfer system whereby data from a host processor 4 may be transferred to a Channel Interface Module (CIM) $8_c$ and then transferred to a Device Interface Module (DIM) $8_d$ from which the data can then be moved to one or more disk drive units 70.

During the course of such a data transfer operation, a block of data from the host processor 4 will be transferred down the channel interfaces $8_c$ to the device interface $8_d$ and then to the peripheral units, such as a disk drive module 70. The block of data transferred may take several different characteristics. For instance, as shown in FIG. 3A, a block of data composed of "X" bytes will have a header portion which may provide for the address of the destination and commands after which the main bulk of data is presented. This is followed by an error detection code (EDC) signature, which has been provided to the block of data in order to characterize the data being transmitted in the main block.

Likewise as seen in FIG. 3B, there may be a data block transfer of a different volume or size as shown by the block designated "Y" bytes. Here again, a header will provide the address destination, commands and other pertinent data after which the main body holds the data to be transferred followed by the Error Detection Code (EDC) signature which characterizes the data being transferred.

When a block of data, such as that of "X" bytes or that of "Y" bytes, is being transferred, it is necessary that some means be provided to recognize the block size and to insure the integrity of the data transfer. The reliability factor occurs when there is a certainty, that when the block of data has been transferred, the original sent data will be duplicated at the receipt point by the received data.

Various earlier methods of error detection and parity checking generally required detection circuitry which would analyze the data transferred to determine whether there was a proper transfer of data in an accurate fashion. These methods generally caused a delay in the transfer time for data movement, which acted to slow up the relative performance of the system.

As seen in FIG. 4, there is shown an example of two different block sizes which are to be transmitted between a sending and a receiving digital module, the first block size of 180 bytes, having a header and EDC signature, is followed by a larger block of 512 bytes, which also has its own personal header and EDC signature.

The present system operates to insure that there will be no delay in the data transfer operation even though blocks of different sizes are being transferred and the different block sizes will concurrently be checked for integrity without any delay to the data transfer operation.

As seen in FIG. 2B, the device interface module $8_d$ (DIM) which is used to carry data to peripheral units, such as a disk drive unit 70, will be seen to have certain functioning modules which enhance the transfer of data to the peripheral units while at the same time providing for reliability in the data transfer by checking the integrity of the data being transferred. Thus, as seen in FIG. 2B, data which has been passed down from the channel interface $8_c$ (CIM) and temporarily resides in the memory buffer $24_d$, will then be passed on bus 6 to a SCSI Protocol Controller (SPC) 80, which will provide management for transferring the data on bus 78 to a selected disk drive unit 70. The unit 70 may represent a multiple number of peripheral units which can receive blocks of data or send blocks of data.

As seen in FIG. 2B, the bus 6 between the memory buffer $24_d$ and the protocol controller SPC 80, is also connected to an integrity circuit $I_c$, 81. The integrity circuit 81 functions on-the-fly in order to check the integrity of the data being transferred. A control processor 10 provides initiation signals to the integrity circuit 81 so that it may provide its error checking function.

As illustrated in FIGS. 3A, 3B, blocks of data to be transferred can occur in different block sizes. FIG. 4 illustrates how each header of a block contains information as to the size of the block by denoting the number of bytes involved. Then after the pertinent data in the block is transmitted, the final portion of each block is seen to have an Error Detection Code (EDC) signature. This signature involves a Hexadecimal Code of, for example, of 9 bytes (36 bits) of which the first byte is a parity value (FIG. 4).

SUMMARY OF THE INVENTION

A data integrity transfer system enables the transfer of different sized data blocks while simultaneously performing on-the-fly error checking and detection.

During the data transfer operations between a first digital unit (designated as the memory buffer) and a second digital unit (designated as the SCSI Protocol Controller), as the data is transferred on an interconnecting bus, an attached integrity circuit performs concurrent checks for parity of each word transferred plus error detection for the entire block transferred.

The integrity checking circuit functions to work on-the-fly while data is being transferred from the memory buffer to the protocol controller (or vice versa) and at the same time, operates to check for any errors which might occur during the transfer. No delay in data transfer occurs due to the integrity checking circuitry.

Data block integrity is maintained during data transfers between two digital modules while data is being transferred on-the-fly. The integrity circuit performs error detector checking (EDC) and a parity check of the data being transferred.

Circuitry is provided to count the number of data blocks transferred and also to sense the length of the data block. An internally generated error detection code (EDC) is compared with each data blocks original EDC signature to validate the propriety of the data block transferred.

When an error is detected in the error detection code or if there is a parity error, then a JK flipflop is set and latched in the interrupt register for an external main processor.

The SCSI Protocol Controller also has the capability to disable the function of checking out the error detection code or to disable reporting of parity errors, or, on the other hand, enabling these functions to occur during normal operations.

BRIEF DESCRIPTION OF THE DRAWINGS

FIG. 5 is a timing diagram illustrating the sequence of functions during on-the-fly integrity checking.

DESCRIPTION OF PREFERRED EMBODIMENT

Figure 1:
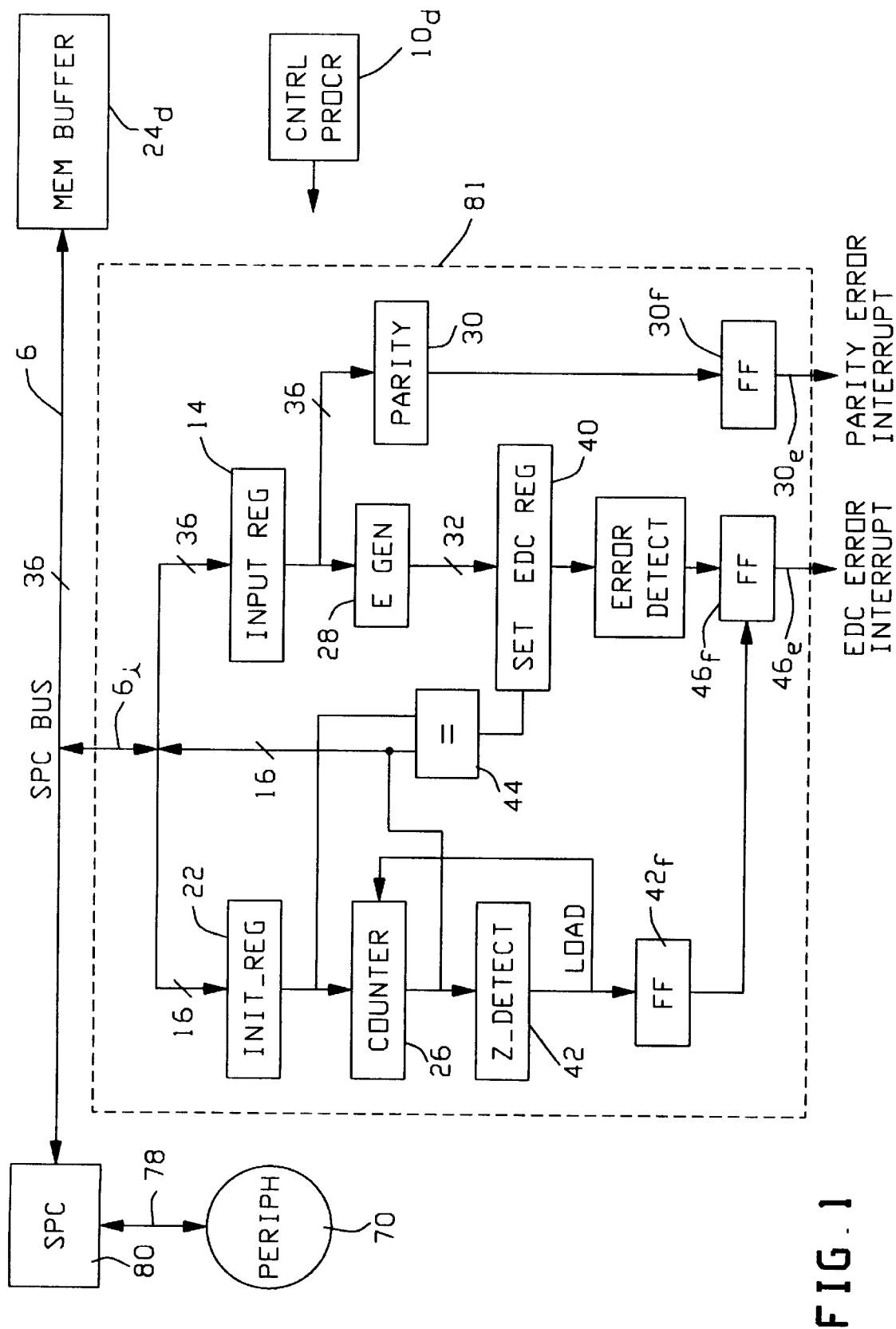
FIG. 1 is a circuit drawing of the integrity checking circuitry which functions on data transfers between two separate digital modules.
Figure 2A:
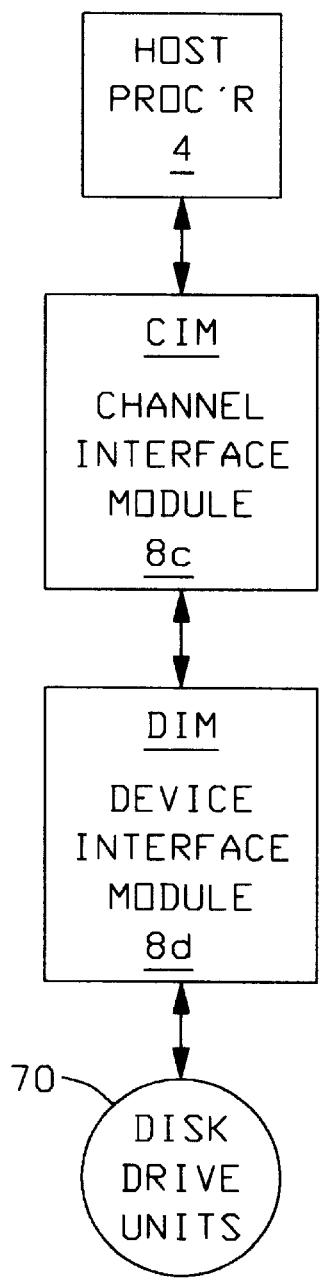
FIG. 2A is a generalized block diagram of a system in which data is transferred from a host processor over to a set of peripherals such as disk drive units.
Figure 2B:
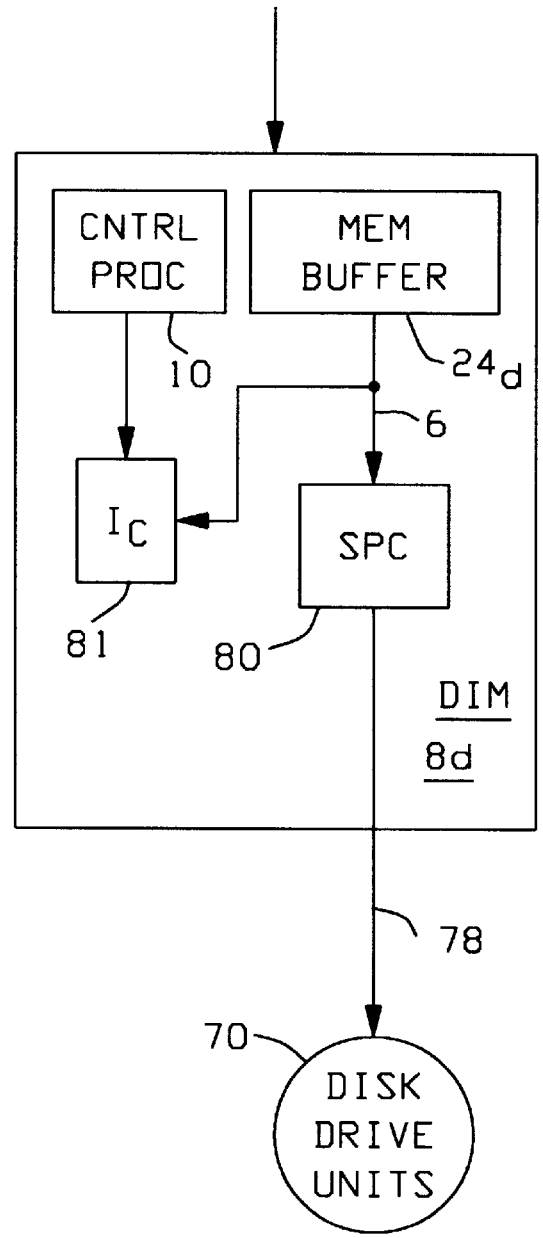
FIG. 2B is a block diagram of the device interface module (DIM) showing the location of the integrity circuit in relationship to bus connections between a memory buffer and a SCSI Protocol Controller.
Figure 3A:
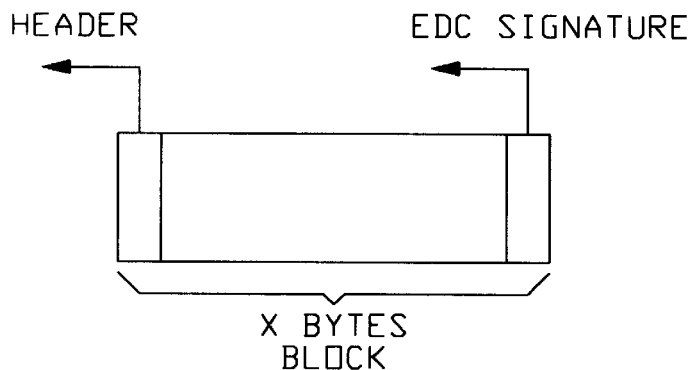
FIG. 3A is a schematic illustration on a data block to be transferred having a length of "X" bytes.
Figure 3B:
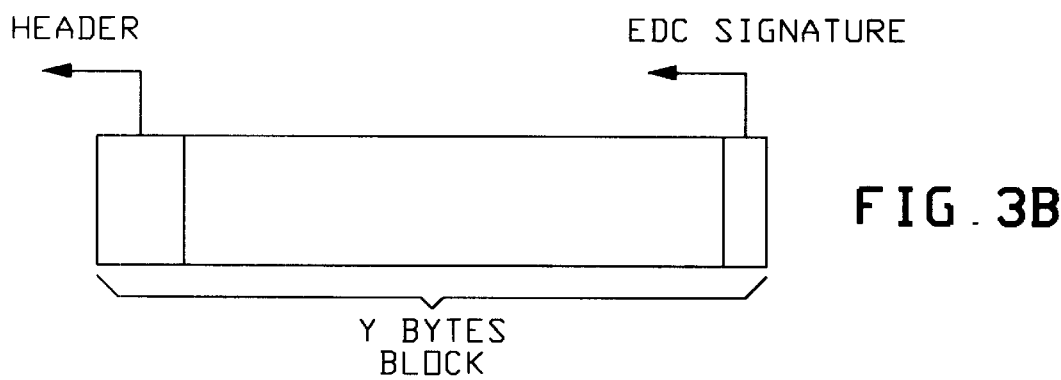
FIG. 3B is a illustration of a data block of a different size which is to be transferred and which shows the components thereof having a totality of "Y" bytes.

An expanded view of a portion of the Device Interface Module (DIM) in FIG. 2B is shown in FIG. 1 wherein a memory buffer $24_d$ is connected by means of a bus 6 over to a SCSI Protocol Controller, (SPC) 80. The protocol controller 80 connects the bus 78 (FIG. 2B) to peripheral units, such as disk units 70.

Attached to the protocol controller bus 6 is seen an auxiliary connecting bus $6_i$ which connects to two registers 22 and 14. The initialize register 22 and the input register 14 both function simultaneously to initialize the integrity checking circuit 81 and to store a duplicate of each data word (36 bits) being transferred on the protocol controller bus 6. Each word is placed momentarily in input register 14.

The initialize register 22 will also indicate the "size" of the block of data being transferred. The input register 14 makes a copy of each data word in the entire block. The input register 14 looks at each block and creates a internal generated signature. The purpose of this is to compare the original signature provided at the end of each block (FIG. 4) with the locally internally generated signature by register 14.

The block counter 26 is used to count the number of data words transferred between the two digital modules $24_d$ and 80. The SCSI Protocol Control (SPC) 80 loads the "size" of the data block into the initialize register 22 before the data transfer. When the block counter 26 reaches a preset limit, the data in the initialize register 22 is loaded into the block counter 26 to indicate the block size for the next block transfer.

The Protocol Processor 80 can read the initialization register 22 in order to save its content when it switches to data transfers of a different block size. Additionally, the SPC 80 can restore the old value of the block counter by writing into these registers.

The initialization register 22 is programmable by the SPC 80 dynamically. The SPC 80 has a processor which loads the data block size into the initialization register 22 before the data transfer. When the block counter 26 reaches its preset limit, then the initialization register 22 data on block size is loaded into the block counter 26 for the next block transfer. This is done when the zero detector circuit 42 senses when the counter 26 has reached zero and thus permits a reloading of the counter 26.

A block size comparitor 44 is used to check the block size on the bus 6 with the block size counted by the counter 26.

The output of the block size comparitor 44 is used to set the error detection code register 40 if the original EDC value does not match the internally generated EDC code.

The output of the zero detector 42 is fed to a pipeline flipflop $42_f$ which is used to set the flipflop $46_f$ which is the error detection code (EDC) error flipflop. The flipflop $42_f$ can only set up the flipflop $46_f$ after the zero detector 42 has reached its zero value.

The data input register 14 is fed to the EDC generator 28 and also to parity checking circuit 30. The parity checking 30 checks for proper parity of each data word being transferred and if a parity error is detected will initiate flipflop $30_f$ to generate a parity error interrupt signal $30_e$ as the particular word is undergoing transfer. The EDC generator 28 generates an internal signature for the data being transferred which is then compared to the original signature sent along which the originally transmitted data. The output of generator 28 is placed in the EDC register 40. From this, the error detection circuit 46 can detect whether there has been an error detected or not. If so, then the flipflop 46 is initiated in order to provide a EDC error interrupt signal on line $46_e$.

In the presently described embodiment, the initialize register 22 and the block counter 26 are 16 bytes wide. Thus, the maximum size allowed is 65,536 words of 36 bits each. When an error is detected by the error detection unit 46 or parity error checker 30, then respectively the JK flipflop $46_f$ and the JK flipflop $30_f$ are set by the hardware and latched into the interrupt register for the control processor $10_d$ to which the system is attached.

The two flipflops $46_f$ and $30_f$ can be reset by the main processor by addressing the flipflop and performing a write operation on it. The interrupt bit of the interrupt register in the main processor will be reset on the next clock.

It may again be noted that the EDC error checking system and the parity error checking system can be "disabled" by the SPC 80 during initialization or when data blocks "without EDC signatures" are being transferred. In normal operation with EDC signatures, the system will allow the reporting of interrupts when the EDC error or parity error occurs.

The sequence of operation when data is being transferred from the memory buffer $24_d$ over to the SCSI Protocol Controller 80 will operate as follows. The initialize register 22 will receive data to sense the size of the block of "X" bytes or a block of "Y" bytes).

The input register 14 simultaneously copies word by word, the data of the entire block, and the final EDC original signature is placed in the EDC register 40 and is compared with internally generated signature from the signature generator 28. If these match, then there has been no EDC error. On the other hand, if these do not match, then the error detection circuit 46 will activate the EDC error interrupt flipflop $46_f$ in order to send a interrupt signal on line $46_e$. Thus, the signature generated in the EDC generator 28 is put in the EDC register 40 for comparison with the original EDC signature. The error detection 46 compares the two signatures and determines whether an EDC error has occurred.

When a new block of data of a different size is subsequently being transferred, then the initialize register 22 will read the first word in order to tell the block size of the data block being transferred.

Referring to FIG. 5, there is illustrated a timing diagram of the sequence of functions involved.

Line A is illustrative of the timing clock, signals.

Figure 4:
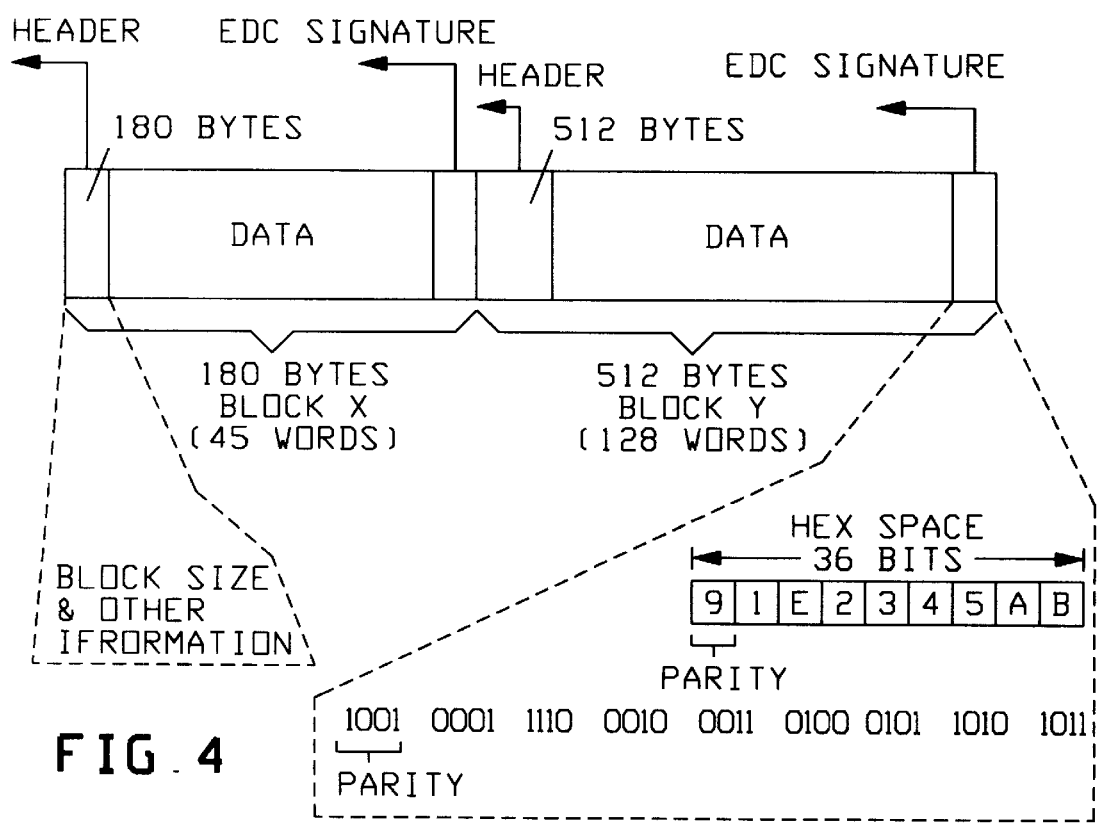
FIG. 4 is a schematic drawing of a data transfer situation where one shorter block of 180 bytes is followed by a longer block of 512 bytes.

Line B shows data on the SPC bus 6 (clock 1 where the first word indicates the block size as being, for example, 512 bytes. Then on each succeeding clock 2, 3, 4, etc. another word (36 bits) is transferred until, at clock 512, the original EDC signature is transferred. FIG. 4 shows a typical example of an EDC signature.

Line C indicates how the initialization register 22 will copy each data word being transferred on SPC bus 6.

Line D indicates how input register 14 also copies each data word from the SPC bus 6, in order to generate an internal EDC signature.

Line E shows how the EDC generator 28 works to generate a new code value for each word on each clock until, at clock 512, the complete internally generated EDC is completed and to be placed in EDC register 40. At clock 512, this internally generated EDC will be compared to the original EDC signature in register 44 (FIG. 1). If there is a mismatch, then error detector 46 will flag the control-processor via flipflop 46$_f$.

Line F indicates how the counter 26 (FIG. 1) counts down each byte from its original setting of 512 bytes. The counter 26 was originally set to 512 (bytes) by the initialization register 22 which received information on the length of the block (block size).

The zero detector circuit 21 (FIG. 1) indicates when the 512 bytes of data have been transferred between digital modules, i.e. the end of the data block.

Line G illustrates how the EDC comparison register operates to signal a "match" or "mismatch" after clock 512.

Line H indicates how the zero detector circuit 42 will reset counter 26 after clock 512.

Line I indicates how the parity check circuit 30 checks the parity of each word transferred on each clock 1, 2, 3, ... 512. If word 1 had the wrong parity, the line I shows how the signal (dashed line) would indicate the error.

Disclosed herein has been a data transfer system providing integrity of data performed on the fly by an associated integrity circuit which senses parity for each word transferred and also checks the error detection code (EDC) signature for each block transferred. The integrity circuitry can also be disabled when data transfers involve blocks which do not provide an EDC signature.

While the preferred embodiment has been described, there may be other configurations which handle the problems of data transfer integrity using the concepts of the attached claims.

What is claimed is:

1. A digital system for establishing the integrity of data transfers between a first transmitting module connected by a bus means to a second receiving module, said system comprising:
    (a) bus means connecting said first and second modules and enabling the parallel transmission of words of data;
    (b) means to determine the size of each block of data being transferred on said bus means;
    (c) wherein each said block of data being transferred includes:
        (c1) a header portion indicating the size of the data block;
        (c2) an original Error Detection Code (OEDC) signature which sets a digital value to the data words in said data block to be transferred;
    (d) means to integrity check, concurrently on-the-fly, each said word and each said data block transferred from said first module to said second module without any delay to the data transfer operation, including:
        (d1) means to generate an error code value for each data word transferred including:
            (d1a) means to accumulate said error code values to form an internally generated resultant Error Detection Code Signature (REDC) after transfer of all the words in said block of data;
        (d2) counter means for holding the number of words in the data block being transferred and including:
            (d2a) means to reduce the amount in said counter means for each word transferred until reaching a zero count limit for the block size;
            (d2b) means to initiate a comparison of said internally generated resultant REDC with said original OEDC after said zero count to see if a match occurs;
        (d3) means to transmit an error signal if a match does not occur;
        (d4) input register means to momentarily copy, during word transfers, each word being transferred;
        (d5) means to determine the rarity of each said word being transferred;
        (d6) means to signal an error flag should the determined parity of said word be inconsistent.

2. The system of claim 1 wherein said bus means transfers a multiple byte word from said first to said second module in one clock time period.

3. The system of claim 1 wherein said means to determine includes:
    (a) initialization register means to capture header data from each data block being transferred, to establish the size of said data block.

4. The system of claim 1 wherein said second receiving module includes:
    (a) means for disabling said means to integrity check thus enabling data transfers to occur without generation of error signals.

* * * * *